Nov. 28, 1961 T. R. DICKINSON ET AL 3,010,151
MODIFIED DOUBLE-BARREL EXTRUSION APPARATUS
Filed Nov. 30, 1959

INVENTORS
T. R. DICKINSON
R. R. GLOYNA
BY Hudson and Young

ATTORNEYS

United States Patent Office 3,010,151
Patented Nov. 28, 1961

3,010,151
MODIFIED DOUBLE-BARREL EXTRUSION APPARATUS
Travis R. Dickinson, South Houston, and Robert R. Gloyna, Pasadena, Tex., assignors to Phillips Petroleum Company, a corporation of Delaware
Filed Nov. 30, 1959, Ser. No. 856,109
12 Claims. (Cl. 18—12)

This invention relates to a modified double-barrel extrusion apparatus. In one aspect the invention relates to an extrusion apparatus having a novel seal at the junctions of the two halves of the extruder liner. In another aspect the invention relates to a method for modifying the liner of a double-barrel extruder to prevent leakage in the event of a failure of a weld.

In the manufacture of thermoplastic materials such as solid polyethylene produced according to the process of U.S. Patent 2,825,721, the thermoplastic material is usually worked in an extruder apparatus to increase the apparent density of the thermoplastic and to remove traces of volatile material therefrom. Extruders designed for this operation often comprise a pair of parallel cylindrical barrels in side-by-side relationship having a central longitudinal opening between them and containing oppositely rotating feed screws to carry the material through the apparatus and simultaneously to perform work upon it. The barrels generally contain a liner which is formed by welding together segments of tubes so as to conform to the inner contour of the barrels. These tubes are usually joined together by a single bead of weld placed in the bottom of a groove formed at the junction of the two tubular sections. A small void space exists between the weld and the barrel. It has been found that in the operation of such an extruder for processing solid polyethylene the weld often fails and allows plasticized polyethylene to escape into the void space above the weld at a point of higher pressure in the extruder and re-enter the extruder at a point of lower pressure. The plasticized polymer picks up impurities existing between the liner and the barrel, for example, the lubricant which is employed in the step of pressing the liner into the barrel, and provides a source of contamination for the polymer product. It has been found that polymer product is discolored by the presence of molybdenum disulfide which was used as the lubricant as a result of failure of a weld in an extruder.

It is an object of this invention to provide a seal to prevent escape of polymer from an extruder liner in the event the weld in the liner fails. It is also an object of this invention to provide a method for preventing contamination of extruded product as a result of failure of a weld in an extruder liner. Other objects and advantages will be apparent to one skilled in the art upon study of this disclosure, including the detailed description of the invention and the accompanying drawing wherein.

According to the present invention the liner of a double-barrel extruder is modified by forming a slot in the bottom of the groove formed at the junction of the two halves of an extruder liner adjacent the top of the weld; placing a strip of ductile, inert metal in the slot on top of the weld; and securing the metal strip in position by filling the remaining portion of the groove with a molten, low-melting-point metal. Ductile, inert metals which can be employed in the practice of the invention include copper, tin, silver, gold, and the like. Low-melting-point metals which can be poured into the groove in molten form include lead and metals or alloys having a melting point of about 300 to 350° C. The melting temperature of the metal should be above that expected in normal operation of the extruder but must not be high enough to cause cracking or warping of the liner.

Figure 1:
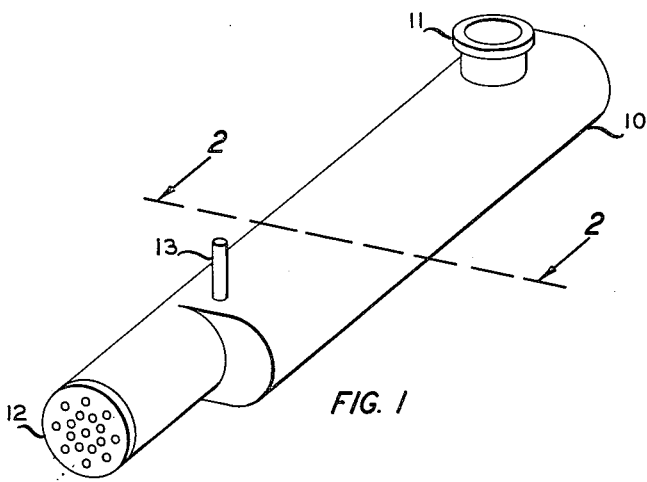
FIGURE 1 is a perspective view of an extruder to which the invention is applicable.

Referring now to the drawing, and particularly to FIGURE 1, an extruder is illustrated comprising shell 10, feed hopper 11, die 12 and vent 13.

Figure 2:
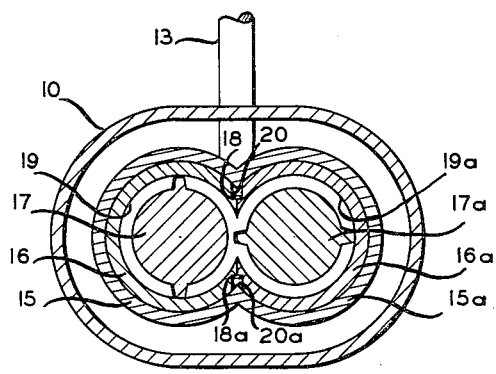
FIGURE 2 is a cross section of the extruder of FIGURE 1 along line 2—2.

FIGURE 2 shows shell 10 enclosing barrel 15, 15a which in turn contains liner 16, 16a press fitted therein. Worms 17, 17a rotate within the liner 16, 16a. The liner comprises two substantially identical halves welded together at 18 and 18a, leaving an open groove 20 and 20a. The interior surface of the liner 18, 18a is coated with a thin coating 19, 19a of an abrasion-resistant material.

Figure 3:
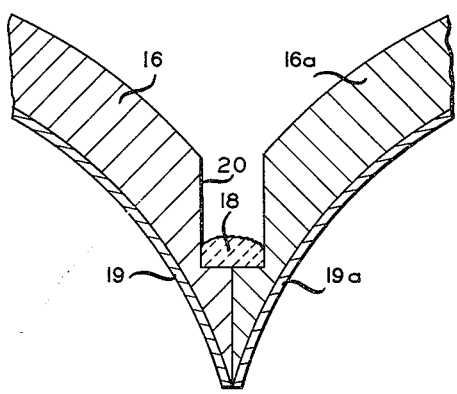
FIGURE 3 is a detail of the portion of FIGURE 2 to which the invention applies.

The weld 18, the groove 20, and the abrasion resistant coating 19, 19a are shown more clearly in FIGURE 3.

Figure 4:
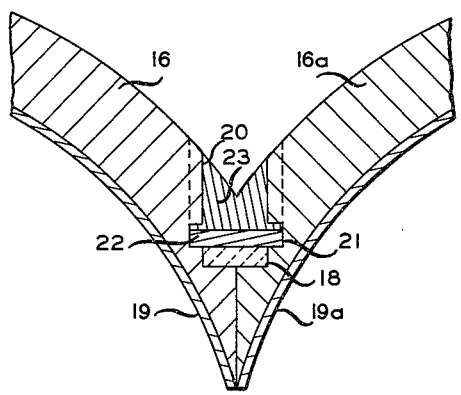
FIGURE 4 shows FIGURE 3 as modified by the invention.

FIGURE 4 shows the liner modified according to the inveniton. A light cut is taken on the top of the weld 18, e.g., by milling, along the entire length of the groove so as to remove irregularities and present a flat top surface on the weld. A slot, indicated at 21, is then cut, e.g., by milling, on each side of the groove along its entire length. This can be done advantageously by drilling a vertical hole at each end of the groove to provide access for, and for removal of, the milling tool, e.g., a Woodruff key seat cutter. A ductile, inert metal strip 22 is then fitted into the slot so as to cover completely the weld. The strip can be inserted into the slot in the form of an inverted V and then flattened. The groove is then filled with molten lead, and the top surface of the lead is shaped, e.g., by milling, so as to conform to the shape of the barrel 15, 15a. The modified liner is then lubricated on its exterior surface and pressed into the barrel.

The following specific example will be helpful in attaining a better understanding of the invention. It is to be understood, however, that the example is by way of explanation and is not to be construed as limiting the invention.

*Example*

A double-barrel extruder, having 4½-inch internal passageways, was used to extrude solid polyethylene. The liner wall thickness was ½-inch steel with a ⅛-inch internal facing of Xaloy 306, a product of Industrial Research Laboratories, Division of Honolulu Oil Corporation, Los Angeles, California. The weld was in the bottom of a substantially rectangular groove 5/16 inch wide and ¾ inch deep formed by recesses in the liner sections at the junction thereof.

The liner developed cracks in the weld joining the two halves of the liner and polymer apparently extruded through the crack at a point of high pressure and re-entered at a point of lower pressure. The polymer which escaped through the crack picked up molybdenum disulfide which, upon re-entry into the extruder, contaminated and discolored the product.

The liner was pulled from the barrel and both top and bottom welds were modified in accordance with the method of the invention. Lead, by itself, cannot be used where direct contact with the polymer will result because of the production standards specifying food service cleanliness. Therefore, in order to avoid contamination of the polymer, the copper seal strip was installed first, then the lead was used as a support to hold the copper in place when polymer pressure is exerted thereon.

The steps involved in modifying the liner were as follows:

A ½-inch diameter hole was bored at each end of the groove to the top of the weld. The top surface of the weld was milled smooth. A 3/32-inch x ½-inch Woodruff key seat cutter was then inserted in one of the ½-inch holes and a slot was cut on each side of the groove for the entire length of the groove, and the tool was removed through the other ½-inch hole at the end of the groove. A ½-inch wide, 16-gage soft copper strip, equal in length to the groove, was crimped into an inverted V, placed in the bottom of the groove and flattened so as to lie flat on the top of the weld. The groove was then filled with molten lead and the surface of the lead was shaped to conform to the contour of the extruder barrel. The surface of the liner was then lubricated with molybdenum disulfide and the liner was pressed into the barrel.

The extruder was placed in service and continuous operation was obtained with no further indication of leakage of polymer through the cracked weld and no further contamination of polymer product.

New liners modified in accordance with the invention have exhibited no indication of failure of the welds or contamination of polymer product.

The liners are modified the entire length of the weld on the bottom side and from just upstream of the vent to the end of the liner near the feed hopper, with respect to the flow of polymer, on the top side of the extruder.

Reasonable variations and modifications are possible within the scope of the disclosure without departing from the spirit and scope of the invention.

That which is claimed is:

1. A liner for a double-barrel extruder comprising a pair of parallel tubular sections welded together so as to form parallel cylindrical passageways with a central longitudinal opening between them wherein the weld is in a groove formed by a recessed portion of the tubular section walls at the point of junction and having a longitudinal slot on each side of said groove adjacent the top of said weld; a ductile, inert metal strip positioned in said slots so as to cover said weld; and sufficient lead positioned on said inert metal strip to fill substantially said groove.

2. The apparatus of claim 1 wherein the inert metal strip is copper.

3. The apparatus of claim 1 wherein the inert metal strip is tin.

4. The apparatus of claim 1 wherein the inert metal strip is silver.

5. The apparatus of claim 1 wherein the inert metal strip is gold.

6. The method of sealing a welded liner for a double barrel extruder against leakage due to failure of a weld situated in a groove formed at the junction of the two halves of the liner, which method comprises forming a slot on each side of the groove parallel to and contiguous with the top of said weld; positioning an inert metal strip in said slots so as to cover said weld; and filling said groove with molten lead.

7. The method of sealing a welded liner for a double barrel extruder against leakage due to failure of the weld which method comprises covering the weld with a ductile, inert metal strip; and sealing said metal strip in place with molten lead.

8. The method of claim 7 wherein the inert metal strip is copper.

9. The method of claim 7 wherein the inert metal strip is tin.

10. The method of claim 7 wherein the inert metal strip is silver.

11. The method of claim 7 wherein the inert metal strip is gold.

12. A method of providing a sealed welded joint which comprises providing a joint adapted to be welded and to receive and retain in place a metal strip covering said joint, welding said joint, covering said joint with a metal strip and sealing said welded joint with the metal strip by covering said strip with a molten metal.

References Cited in the file of this patent
UNITED STATES PATENTS

Re. 23,948    Fuller  --------------- Feb. 15, 1955